G. CARLSON.
POULTRY DISINFECTOR.
APPLICATION FILED SEPT. 11, 1918.
1,303,851.
Patented May 20, 1919.
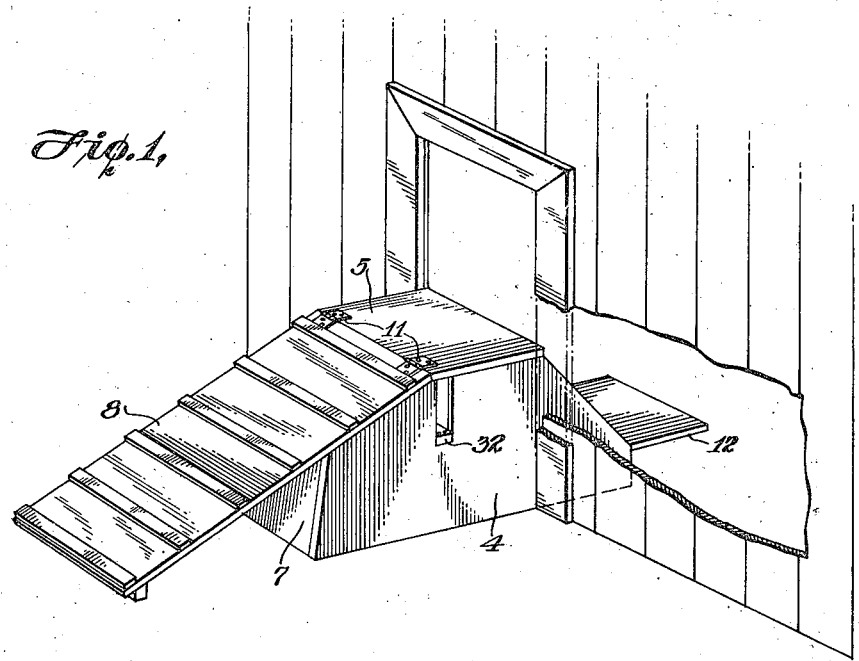
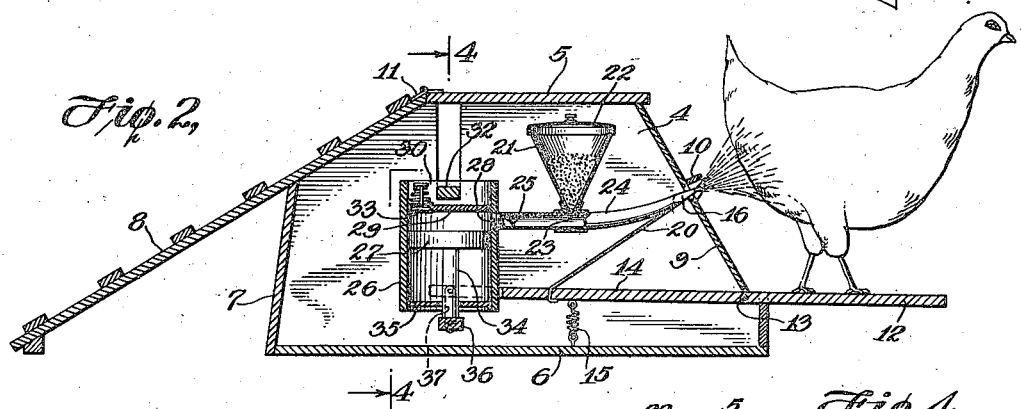
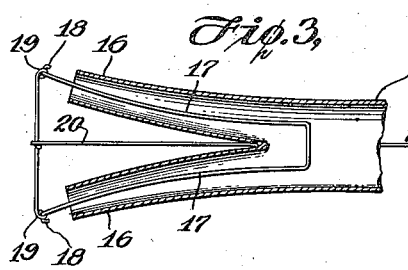
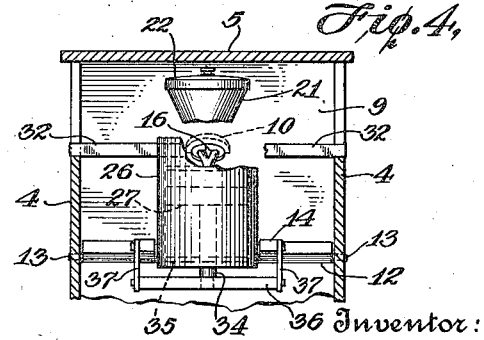
Inventor:
George Carlson
By his Attorneys,
Rogers, Kennedy & Campbell.

UNITED STATES PATENT OFFICE.

GEORGE CARLSON, OF NEW YORK, N. Y.

POULTRY-DISINFECTOR.

1,303,851.   Specification of Letters Patent.   Patented May 20, 1919.

Application filed September 11, 1918. Serial No. 253,621.

*To all whom it may concern:*

Be it known that I, GEORGE CARLSON, a national of Finland, residing at New York, in the county of New York and State of New York, have invented a certain new and useful Poultry-Disinfector, of which the following is a specification, reference being had therein to the accompanying drawing.

This invention is a novel poultry disinfector, that is to say, an apparatus adapted to dust an insecticide powder, or to spray any other disinfectant upon live poultry. The principal object of the present invention is to afford such an apparatus which will be wholly self-acting and requiring very little attention from the poultry keeper, and which as well will be simple in structure, durable, effective in action and convenient of use. Other objects and advantages of the present invention will appear in the hereinafter following description or will be understood to those skilled in the art.

To the attainment of such objects and advantages, the present invention consists in the novel poultry disinfector and the described and illustrated features of combination, arrangement, mechanism and detail. The illustrated embodiment of the present invention discloses a compact and portable apparatus which can be placed where desired, for example, in the entrance to the hen-house or a runway, and as will be seen it is adapted to operate in both directions, that is, on poultry coming and going so that they are sprayed at both front and rear. The apparatus perferably contains a box-like structure from the front of which projects a balanced low platform across or upon which a hen may walk or hop in entering or leaving the hen-house. Within the casing are the pneumatic sprayer directed outwardly at the front, and the mechanism for operating and controlling the same.

In the accompanying drawings illustrating one embodiment of the invention, Figure 1 is a perspective view showing my disinfecting apparatus placed at the entrance of a hen-house.

Fig. 2 is a side elevation on a larger scale and with the nearest of the side walls omitted to better disclose the interior mechanism and operation.

Fig. 3 is a top view on large scale, of the double nozzle and its cleaning device.

Fig. 4 is a left end view of the apparatus, partly sectioned and partly broken away.

The box or casing of my invention comprises side walls 4, 4, a top wall 5 over which the poultry may walk, and preferably a bottom wall or base 6. A rear wall 7 is also shown, and an inclined plank 8 leads up from the ground at the rear to the top of the box. A front wall 9 may be added to protect the operative parts, and this is shown as having a small flange or hood 10 over the opening through which the nozzle projects. The top wall 5 may be hinged at 11 to permit lifting and inspection.

The operating member of this invention is the balanced low platform or board 12 projecting forwardly, as indicated, and pivoted to the side walls of the frame at 13. The weight of a hen on the platform 12 depresses it and causes its inward extension 14 to lift slightly against the resistance of a spring 15 adjusted to hold the platform 12 balanced in upward position. Fig. 2 indicates a hen having jumped down from the box top 5 to the platform 12. A sprayer or dusting device 16 is shown located so as to spray the disinfecting powder toward the rear of the hen. This sprayer may be of different types, but I prefer a multiple nozzle and have shown two spray exits 16, 16, side by side and slightly diverging. In order to keep the spray nozzles clean, I have provided a bent wire 17 which extends bodily through both nozzles and at its outer end is hooked at 18, 18 for connection to eyes 19, 19 of an operating wire 20 extending rearwardly and secured to a movable part of the board or extension 14. By this arrangement the wires are moved in the nozzles every time the apparatus is worked.

A hopper 21 having an airtight cover 22 holds the disinfectant or powder, which passes by a pinhole 23 into the pipe 24 which leads directly to the sprayer nozzle 16. A flap valve 25 in the pipe 24 permits air to flow toward but not from the nozzle.

The pneumatic mechanism comprises an operating cylinder 26 constructed of a short length of iron pipe and having fitted within it a piston 27 above which is the outlet 28 to the pipe 24 and nozzle. The cylinder has a head 29 slightly below its top end, affording an extension 30 in which are formed opposite holes through which passes a frame cross-bar 32 extending from sidewall to sidewall of the apparatus, for supporting the cylinder. A spring inlet valve 33 admits air on the piston down stroke. The piston is operated by a rod 34 guided by a cross-piece 35 at the lower end of the cylinder, and the rod has a cross-head 36 the ends of which are connected by links or rods 37 to the two sides of the yoked extremity of the board or platform 14.

By this arrangement, when the hen jumps on the front part 12 of the platform, the rear or interior end causes the piston to rise thus forcing air from the cylinder through the pipe 24, so as to carry the powder from the hopper 21 to the nozzle 16, whence it is sprayed upon the fowl. When the air is under pressure part of it will pass through the pinhole 23 into the hopper thus stirring up the disinfectant, and such air forced into the hopper promptly returns thus insuring passage of a suitable amount of powder into the pipe 24 at each operation.

It will be noticed that the balanced platform is pivoted to the frame of the apparatus, and that the pneumatic device is mounted on the frame and independent of the platform although operated by the movements of the latter. I am enabled to make the frame in the form of a hollow casing so combined with the platform that the latter extends partly outside and partly inside of the casing, the inside end and the mechanism operated by it being protected by the casing. The whole device is very compact, and the compactness of the interior parts is enhanced by the low location of the cylinder which is permitted by the use of the connecting links extending from the piston cross-head upwardly to the extremity of the inside part of the balanced platform.

It will thus be seen that I have described a novel poultry disinfector embodying the principles and attaining the advantages of the present invention. Since many matters of design, arrangement, combination and detail may be variously modified without departing from the underlying principles, no limitation thereto is intended except in so far as specified in the appended claims.

What is claimed is:

1. A poultry disinfector comprising a casing, a balanced low platform across which a hen may walk, extending both inside and outside of the casing, an ascending walk at the side of the casing opposite the outside part of said platform by which the hen may walk to the top of the casing and jump down upon the platform, a pneumatic sprayer mounted inside the casing and directed outwardly at the body of a hen on the outside part of the platform, and connections from the inside part of the platform by which the hen's weight may cause the actuation of the sprayer.

2. A poultry disinfector comprising a casing, a balanced platform located substantially lower than the top of said casing and having an exterior portion upon which a hen may alight, a pneumatic sprayer means comprising an air forcing device and a nozzle directed at the under parts of a hen on the platform, and connections from the platform by which the hen's weight may cause the actuation of the air forcing device.

3. A poultry disinfector comprising a casing substantially closed to exclude poultry from passing beneath the top of the casing, a disinfectant container having its outlet within the upper part of the casing, a balanced platform having an interior portion extending within the casing beneath the container and an exterior portion upon which a hen may alight to actuate the platform, a spray connection from the container outlet extending to a nozzle directed outwardly from the casing above said balanced platform, an air-forcing device actuated by the movements of the balanced platform, a movable nozzle cleaning device and a connection from the interior portion of the platform to said nozzle cleaning device.

4. A poultry disinfector comprising an inclosed casing, a balanced platform located substantially lower than the top of said casing and having an extension within the casing and an exterior portion upon which a hen may descend, the same pivoted to said casing, a pneumatic sprayer mounted on the casing directed at the body of a hen on the platform, and connections from the platform by which the hen's weight may cause the actuation of the sprayer.

5. A poultry disinfector comprising a casing substantially closed to exclude poultry from passing beneath the top of the casing, a balanced low platform upon which a hen may alight, extending both inside and outside of the casing, a pneumatic sprayer means comprising an air forcing device and a nozzle mounted inside the casing and directed outwardly at the under parts of a hen on the outside part of the platform, and connections from the inside part of the platform by which the hen's weight may cause the actuation of the air forcing device.

6. A poultry disinfector comprising a casing, a balanced low platform upon which a hen may alight, extending both inside and outside of the casing, said parts shaped and arranged so that the hen may walk across the top of the casing and jump down upon the platform, a pneumatic sprayer directed outwardly at the under parts of a hen on the outside part of the platform, and connections from the inside part of the platform by which the hen's weight may cause the actuation of the sprayer.

7. A poultry disinfector comprising a casing, a balanced platform having an extension within the casing and an exterior portion upon which a hen may alight, an upright cylinder secured inside the casing, a piston in said cylinder, a piston rod extending downwardly to a point lower than said platform, a spray device connected to the cylinder directed at the under parts of a hen on the platform, a piston reciprocable within the cylinder, and connections from the platform by which the hen's weight may cause the actuation of the piston consisting of a link extending from the platform downwardly to said piston rod.

8. A poultry disinfector comprising a portable boxlike casing inclosed to exclude poultry and shaped so that a hen may walk across the top of the casing, said casing having one of its walls openable to give access from above to the interior, a low balanced platform pivoted to the casing having an extension within the casing and an exterior portion upon which a hen may descend from the top of said casing, an air forcing device mounted within the casing above the interior extension of said platform, air connections from said device arranged to spray the under parts of a hen on said platform, and a disinfectant supply arranged within the casing to supply disinfectant to said air connections; whereby when a hen walks over the top of the casing and descends upon the platform the platform is tipped to cause the actuation of the devices within the casing to cause the disinfectant to be sprayed upon the hen.

In testimony whereof I have affixed my signature hereto.

GEORGE CARLSON.